United States Patent [19]

Hurney et al.

[11] 4,074,310
[45] Feb. 14, 1978

[54] SELECTIVE CCTV COMMUNICATING

[75] Inventors: Paul A. Hurney, Lexington; John P. Curtis, Reading, both of Mass.

[73] Assignee: Artel Manufacturing Corporation, Waltham, Mass.

[21] Appl. No.: 635,409

[22] Filed: Nov. 26, 1975

[51] Int. Cl.$^2$ .............................................. H04N 7/18
[52] U.S. Cl. ........................................ 358/84; 325/31; 325/63; 325/308; 358/86
[58] Field of Search ............... 178/DIG. 13; 325/308, 325/31, 63, 442, 461; 358/84, 86

[56] References Cited

U.S. PATENT DOCUMENTS

| | | | |
|---|---|---|---|
| 3,778,716 | 12/1973 | Stokes | 325/63 |
| 3,934,079 | 1/1976 | Barnhart | 325/31 |

*Primary Examiner*—Howard W. Britton
*Attorney, Agent, or Firm*—Charles Hieken

[57] ABSTRACT

A system selectively provides a selected program, such as a movie, to viewers who select the program by pushing a button as an attachment to a television set. The selected program is carried on a standard television channel unused in the area for regular programming having a carrier frequency $f_c$. This signal is mixed with the second harmonic of the master oscillator at the input of the master antenna TV system to translate the selected program channel to a midband channel between the standard high and low VHF television bands. The master oscillator signal is also injected into the input of the MATV system and used for providing remote control of the room box and as an input to a frequency converter which converts the midband channel back to the standard TV channel when the user presses the selector button on the room box. A command carried by the master oscillator signal produces a pulsed radio frequency signal having a width that signifies the state of the room box in a time slot indicating the room in which the box is located.

4 Claims, 1 Drawing Figure

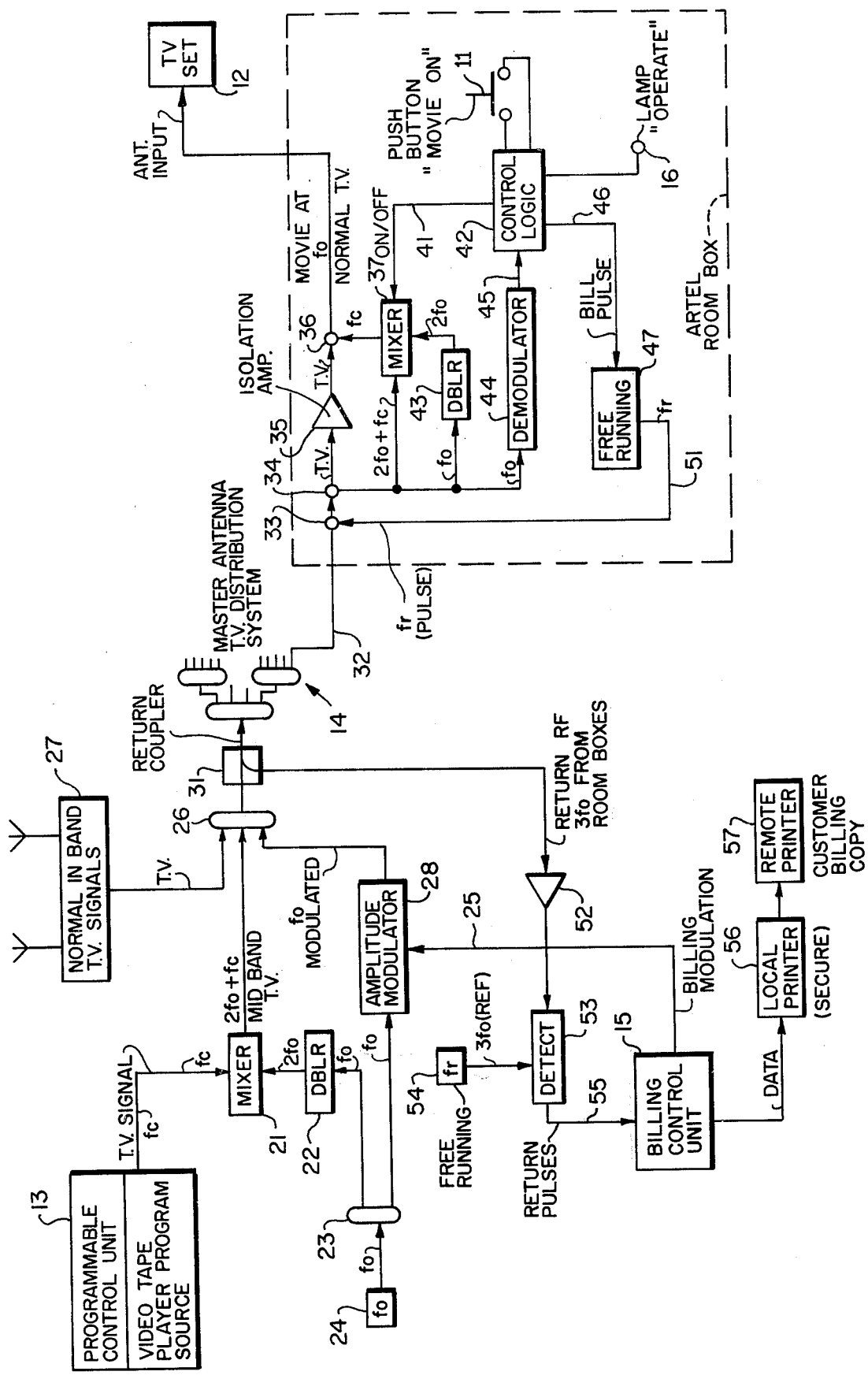

SELECTIVE CCTV COMMUNICATING

BACKGROUND OF THE INVENTION

The present invention relates in general to selectively providing signals and more particularly concerns novel apparatus and techniques for allowing a subscriber to select a special program for viewing while indicating at a central location that the program is being viewed. The invention achieves these results with apparatus that is reliable, relatively inexpensive and relatively easy to install using existing communications channels, such as the transmission lines in a master antenna television system (MATV) already installed in a motel or hotel.

It is an important object of the invention to provide methods and means for selectively providing signals.

It is another object of the invention to achieve the preceding object with television programs.

It is a further object of the invention to achieve one or more of the preceding objects while using existing transmission links in an MATV.

It is a further object of the invention to achieve one or more of the preceding objects with reliable apparatus that is relatively inexpensive to assemble, operate and install.

It is a further object of the invention to achieve one or more of the preceding objects while providing signals that facilitate monitoring at a central location those remote locations viewing the channel.

It is a further object of the invention to achieve one or more of the preceding objects with a system that does not interfere with viewing other television channels when the special channel is not selected.

It is another object of the invention to achieve one or more of the preceding objects while providing secure operation.

SUMMARY OF THE INVENTION

According to the invention, there is a source of a selectable signal having spectral components within a predetermined standard television channel, a source of a master oscillator signal, means at a central location responsive to the master oscillator signal for providing a predetermined harmonic of the master oscillator signal, means for mixing the special signal with the latter predetermined harmonic to provide a midband signal that is the special signal translated to a channel that is outside the bands including standard television channels, and means for combining a signal related to the master oscillator signal of the same frequency, the midband signal and normal television signals to provide a combined signal to the input of an MATV system. Preferably the signal related to the master oscillator signal is modulated with control signals, typically at the vertical synchronization rate, for interrogating remote units associated with a television set at a remote location. The remote unit includes means responsive to the signal related to the master oscillator signal for providing the predetermined harmonic, and means for selectively mixing the latter harmonic with the midband signal to provide the special signal on the predetermined television channel in response to a signal selecting the special channel for viewing at the remote location. The remote unit also includes control logic means responsive to the latter signal and the control signal modulated upon the master oscillator signal for providing a signal pulse at a time representative of the location of the control unit and coded to signify that the special channel has been selected for modulating a return carrier signal of frequency $f_r$ that is transmitted through the MATV system back to the central location to provide an indication at the central location of those remote locations where the special channel is being viewed.

A feature of the invention is that the frequency of the master oscillator signal is not critical and may actually depart from a specified nominal value by an amount much greater than could be tolerated by a standard television converter.

Numerous other features, objects and advantages of the invention will become apparent from the following specification when read in connection with the accompanying drawing, the single figure of which shows

BRIEF DESCRIPTION OF THE DRAWING

A block diagram illustrating the logical arrangement of a system according to the invention.

DETAILED DESCRIPTION OF PREFERRED EMBODIMENTS

With reference now to the drawing, there is shown a block diagram illustrating the logical arrangement of a system according to the invention. A user closing a switch 11 at a remote location, such as a hotel or motel room, enables a television set 12 to receive a special television program provided by a source 13 at a central location over an existing MATV distribution system 14 while providing signals to billing control unit 15 at the central location indicating that the special program is being viewed at the particular remote location. A programmable control unit typically comprising a videotape player program source that modulates a video signal in accordance with conventional vestigial sideband modulation upon a signal of carrier frequency $f_c$ provides a television signal within a predetermined standard television channel that is not used in the locality of the motel or hotel. This signal is coupled to one input of mixer 21 that receives another signal of frequency $2f_o$ at its other input from doubler 22 to provide as an output the television signal provided by source 13 translated to a channel having a carrier frequency of $2f_o + f_c$ between the standard low and high VHF channels.

Doubler 22 receives a signal of frequency $f_o$ from one output of signal splitter 23 that receives the output of master oscillator 24. The other output of signal splitter 23 provides a signal of frequency $f_o$ to amplitude modulator 24 that receives a billing modulation signal at its modulating input over line 25 from billing control unit 15, this signal typically being pulses at 60 Hz in synchronism with the vertical sync pulses. If desired, these pulses could be derived from videotape player program source 13.

A signal combiner 26 receives the midband television signal from mixer 21, the modulated master oscillator signal from amplitude modulator 24 and standard television signals from the antenna system 27 for transmission through directional coupler 31 to the input of MATV 14 for transmission to each remote unit typically located in a hotel or motel room over already installed transmission lines.

Each remote unit receives the combined signal over a typical transmission line, such as 32 through a coupler 33 and signal splitter 34. Isolation amplifier 35 receives the standard television signals from one output of signal splitter 34 and provides these signals to one input of combiner 36. The other input of combiner 36 receives the special television signal translated back to a standard channel having a carrier frequency $f_c$ by gated mixer 37 when gated on by a signal on line 41 from control logic 42 when pushbutton switch 11 is actuated to select the special channel for viewing. ON lamp 46 then ignites when pushbutton switch 11 is activated. Mixer 37 combines the special television channel carried at the midband frequency received from signal splitter 34 with the signal of frequency $2f_o$ provided by doubler 43.

A demodulator 44 detects the pulses carried on the master oscillator signal of frequency $f_o$ to provide pulses on line 45 at the vertical deflection rate to control logic 42 that responds by providing a bill pulse on line 46 a predetermined time interval thereafter representative of the location of the remote unit. The bill pulse modulates keyed oscillator 47 to provide a signal of return frequency $f_r$ on line 51 that is returned through directional couplers 33 and 31 to buffer amplifier 52 at the central station. The output of buffer amplifier 52 is applied to input of detector 53. Return pulses on line 55 are sent to billing control unit 15 that identifies the rooms then viewing the special channel. The output of billing control unit 15 may provide data to local printer 56 and remote printer 57 to print out information on the rooms watching special programs and copies for customer billing. The specific circuitry for identifying the rooms selecting the special channel and effecting the billing is well known in the art, not a part of the invention and not described herein to avoid obscuring the principles of the invention. Similarly, specific circuit details of the various blocks are well-known in the art and not described in detail herein. For example, control logic 42 may typically comprise a flip-flop that is set when pushbutton 11 is actuated and reset when the modulator 45 provides a resetting code upon the completion of a movie or other special program. The flip-flop when set then enables mixer 37 on line 41 and may also be used to illuminate ON lamp 16. The circuitry between input line 45 and bill pulse line 46 may comprise any suitable active or passive delay means that furnishes a delay representative of the room address.

The invention is characterized by a number of advantages. The precise frequency of the master oscillator is not critical and may be varied in time over a sufficient range to keep a standard television converter from providing picture quality which is acceptably viewable. The return signal at an r-f frequency $f_r$ in the midband range is generated on command and transmitted as a pulse having a width signifying the state of the room box and located in time to indicate the control unit address. Thus, the invention provides a positive indication that the system is operating and could be used, for example, to signify an alarm condition in the room upon failing to detect the occurrence of pulses in time slots assigned to a particular room.

A feature of the invention using the master oscillator signal and a predetermined harmonic for different functions so that interference is avoided while detection is readily accomplished with relatively simple, reliable, inexpensive apparatus.

There has been described novel apparatus and techniques for selectively communicating, particularly allowing a viewer to selectively view a special television channel while monitoring the remote selection at a central location. It is evident that those skilled in the art may now make numerous modifications and uses of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Selective communication apparatus comprising, a source of a master oscillator signal of frequency $f_o$, a source of a special signal modulated upon a carrier of frequency $f_c$, signal processing means responsive to said master oscillator signal for providing a processed signal of predetermined frequency that is integrally related to that of said master oscillator signal, mixing means responsive to said special signal and said processed signal for providing said special signal translated in frequency by an amount corresponding to the algebraic combination of said predetermined frequency and said frequency $f_c$, a source of other signals in a frequency range embracing said frequency $f_c$ outside the frequency range embracing the translated special signal, means for combining said other signals, said translated special signal and a signal related to said master oscillator signal of said frequency $f_o$ for providing a combined signal, master distributing means for receiving said combined signal and providing it to a plurality of remote locations with each remote location having a remote unit and each remote unit comprising, a remote unit output for coupling signals to a utilization device, means for coupling all said other signals to said remote unit output, means at said remote unit responsive to said translated special signal and said signal related to said master oscillator signal for selectively translating said special signal to the frequency range embracing said other signals for transmission to said remote unit output in response to a selection signal transmitted thereto over a path entirely at the location of said remote unit, and means at said remote unit for providing said selection signal.

2. Selective communication apparatus in accordance with claim 1 and further comprising means responsive to the occurrence of said selection signal for transmitting billing pulses from said remote unit to said central location for providing an indication at said central location that said special signal is then being used at said remote unit.

3. Selective communication apparatus in accordance with claim 1 wherein said other signals are television signals and said frequency range embracing said other signals corresponds to the standard television band.

4. Selective communication apparatus in accordance with claim 2 wherein said other signals are television signals and said frequency range embracing said other signals corresponds to the standard television band.

* * * * *